(12) United States Patent
Ji et al.

(10) Patent No.: US 12,181,983 B2
(45) Date of Patent: Dec. 31, 2024

(54) DATA STORAGE DEVICE, MEMORY CONTROLLER AND METHOD OF OPERATING THE SAME

(71) Applicant: SK hynix Inc., Icheon-si (KR)

(72) Inventors: Seung Hun Ji, Icheon-si (KR); Min O Song, Icheon-si (KR); Jae Il Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 37 days.

(21) Appl. No.: 18/329,423

(22) Filed: Jun. 5, 2023

(65) Prior Publication Data

US 2024/0193053 A1    Jun. 13, 2024

(30) Foreign Application Priority Data

Dec. 13, 2022  (KR) .................. 10-2022-0173911

(51) Int. Cl.
*G06F 11/00* (2006.01)
*G06F 11/14* (2006.01)
*G06F 12/02* (2006.01)

(52) U.S. Cl.
CPC ...... *G06F 11/1469* (2013.01); *G06F 12/0292* (2013.01); *G06F 2201/84* (2013.01); *G06F 2212/1032* (2013.01); *G06F 2212/2022* (2013.01)

(58) Field of Classification Search
CPC .. G06F 3/0619; G06F 3/0679; G06F 12/0246; G06F 11/1048; G06F 11/1068; G06F 11/1441; G06F 11/1469; G06F 1/30; G11C 5/141; G11C 16/30
See application file for complete search history.

(56) References Cited

U.S. PATENT DOCUMENTS

| | | | |
|---|---|---|---|
| 2010/0146333 A1* | 6/2010 | Yong | G06F 11/1441 713/340 |
| 2017/0060768 A1* | 3/2017 | Zhang | G06F 3/0652 |
| 2020/0004675 A1* | 1/2020 | Park | G06F 12/0246 |

FOREIGN PATENT DOCUMENTS

| | | |
|---|---|---|
| KR | 101506675 B1 | 3/2015 |
| KR | 1020200001158 A | 1/2020 |

* cited by examiner

*Primary Examiner* — Michael Maskulinski
(74) *Attorney, Agent, or Firm* — WILLIAM PARK & ASSOCIATES LTD.

(57) ABSTRACT

A data storage device includes a storage and a memory controller. The storage is configured to store data. The memory controller generates meta-data including a mapping relationship between a logical address used in an external device and a physical address used in the storage. The memory controller generates a normal meta-slice having a first size including the meta-data in a first operation mode. The memory controller stores a meta-page including the normal meta-slice in the storage. The memory controller generates a modified meta-slice having a second size as a part of the normal meta-slice in the second operation mode. The memory controller stores a meta-page including the modified meta-slice and context data corresponding to size information of the modified meta-slice in the storage. The memory controller restores the meta-data based on the context data in a power-on mode.

18 Claims, 4 Drawing Sheets

DATA STORAGE DEVICE, MEMORY CONTROLLER AND METHOD OF OPERATING THE SAME

CROSS-REFERENCES TO RELATED APPLICATION

The present application claims priority under 35 U.S.C. § 119(a) to Korean application number 10-2022-0173911, filed on Dec. 13, 2022, in the Korean Intellectual Property Office, which is incorporated herein by reference in its entirety.

BACKGROUND

1. Technical Field

Various embodiments generally relate to a semiconductor integrated circuit device, more particularly, to a data storage device, a memory controller and a method of operating the data storage device.

2. Related Art

A data storage device may perform data input/output operations by using a volatile memory device or a non-volatile memory device as storage medium in accordance with requests of the external device.

A flash memory including a non-volatile memory device may have advantages, such as massive capacity, non-volatility, a low cost, low power consumption, a rapid data-processing speed, etc., so that the flash memory may be used for the storage medium of the data storage device.

A logical address used in the external device and a physical address used in the storage medium may be different from each other. Thus, a mapping relationship between the logical address and the physical address may be managed by map data.

A controller configured to control the storage medium may generate, erase, and change meta-data including the map data. The controller may periodically store the meta-data.

The data storage device may receive power from an auxiliary power source when a sudden power-off (SPO) is generated to flush processed data in the storage medium. It may be required to stably store the meta-data as well as user data in the storage medium in the SPO situation. Thus, the capacity of the auxiliary power source may be determined in accordance with an amount of the data flushed in the storage medium.

SUMMARY

According to example embodiments, there may be provided a data storage device. The data storage device may include a storage and a memory controller. The storage may be configured to store data. The memory controller may generate meta-data including a mapping relationship between a logical address used in an external device and a physical address used in the storage. The memory controller may generate a normal meta-slice having a first size including the meta-data in a first operation mode. The memory controller may store a meta-page including the normal meta-slice in the storage. The memory controller may generate a modified meta-slice having a second size as a part of the normal meta-slice in the second operation mode. The memory controller may store a meta-page including the modified meta-slice and context data corresponding to size information of the modified meta-slice in the storage. The memory controller may restore the meta-data based on the context data in a power-on mode.

According to example embodiments, there may be provided a memory controller. The memory controller may include a processor, a meta-data flush circuit and a meta-data rebuild circuit. The processor may generate meta-data including a mapping relationship between a logical address used in an external device and a physical address used in a storage. The meta-data flush circuit may generate a normal meta-slice having a first size including the meta-data in a first operation mode. The meta-data flush circuit may store a meta-page including the normal meta-slice in the storage. The meta-data flush circuit may generate a modified meta-slice having a second size as a part of the normal meta-slice in the second operation mode. The meta-data flush circuit may store a meta-page including the modified meta-slice and context data corresponding to size information of the modified meta-slice in the storage. The metal-data rebuild circuit may restore the meta-data based on the context data in a power-on mode.

According to example embodiments, there may be provided a method of operating a data storage device. The data storage device may include a storage and a memory controller configured to control the storage. In the method of operating the data storage device, the memory controller may generate meta-data including a mapping relationship between a logical address used in an external device and a physical address used in the storage. The memory controller may generate a normal meta-slice having a first size including the meta-data in a first operation mode. The memory controller may store a meta-page including the normal meta-slice in the storage. The memory controller may generate a modified meta-slice having a second size as a part of the normal meta-slice in the second operation mode. The memory controller may store a meta-page including the modified meta-slice and context data corresponding to size information of the modified meta-slice in the storage. The memory controller may restore the meta-data based on the context data in a power-on mode.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present disclosure will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The present disclosure is described herein with reference to cross-section and/or plan illustrations of idealized embodiments of the present disclosure. However, embodiments of the present disclosure should not be construed as limiting the inventive concept. Although a few embodiments of the present disclosure will be shown and described, it will be appreciated by those of ordinary skill in the art that changes may be made in these embodiments without departing from the principles and spirit of the present disclosure.

Figure 1:
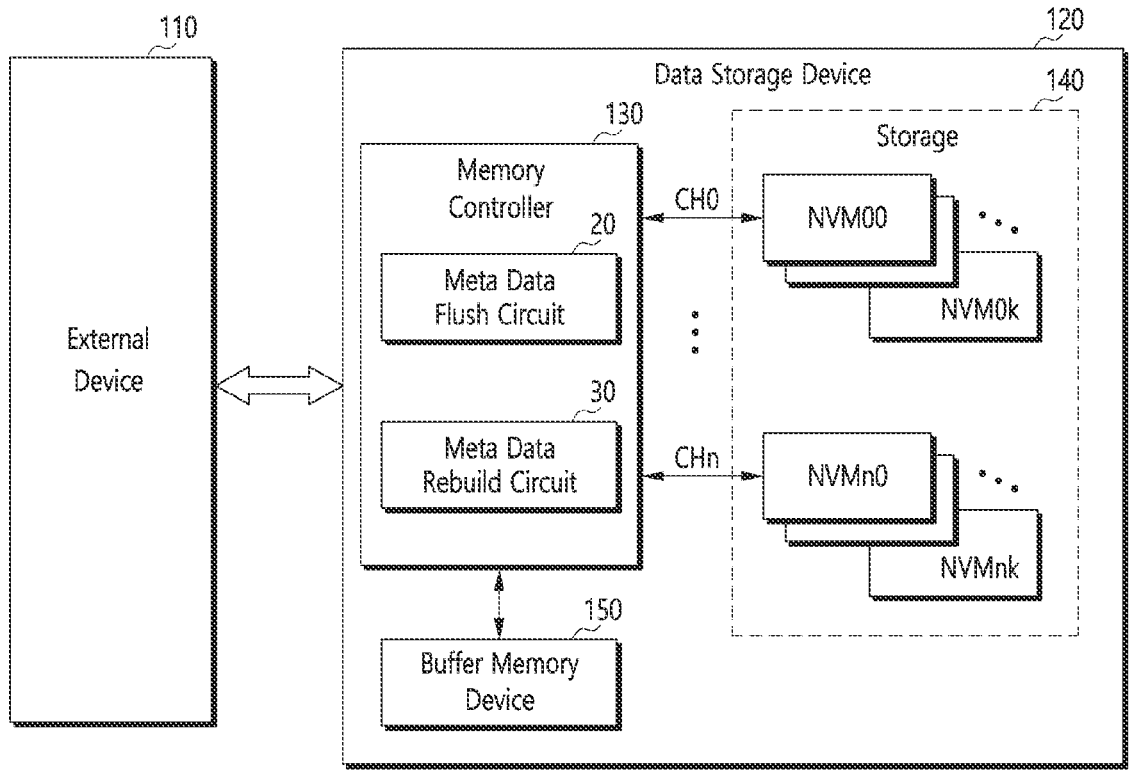
FIG. 1 is a view illustrating a data processing system in accordance with example embodiments.

FIG. 1 is a view illustrating a data processing system in accordance with example embodiments.

Referring to FIG. 1, a data processing system 10 of example embodiments may include an external device 110 and a data storage device 120.

For example, the external device 10 may include a portable electronic device, such as a smart phone, a personal electronic device such as a laptop computer, a desktop computer, a game device, a TV, a beam projector, etc., and various information processing devices for processing large amounts of data, such as a server, a workstation, etc. The external device 10 may act as a master device with respect to the data storage device 120.

The data storage device 120 may be operated in response to a request of the external device 110 or may process internal operations. The data storage device 120 may store data accessed by the external device 110. That is, the data storage device 120 may be used for a main storage device or an auxiliary storage device of the external device 110. The data storage device 120 may include a memory controller 130, a storage 140, and a buffer memory device 150. The memory controller 130 may act as a master device with respect to the storage 140. The data storage device 120 may include a memory card connected with the external device 110 through various interfaces. In example embodiments, the data storage device 120 may include a solid state drive (SSD).

The memory controller 130 may control the storage 140 in response to the request of the external device 110. For example, the memory controller 130 may store data provided from the external device 110 in the storage 140. The memory controller 130 may provide the external device 110 with the data read from the storage 140. In order to perform the operations, the memory controller 130 may control a read operation, a program (write) operation, and an erase operation of the storage 140.

The buffer memory device 150 may store data (normal data) accessed when the data storage device 120 inputs/outputs data together with the external device 110 or the data storage device 120 may perform the internal operation. Further, the buffer memory device 150 may store meta-data including mapping information related to the normal data, state information of the storage 140, etc. FIG. 1 may exemplarily show the buffer memory device 150 outside the memory controller 130, not limited thereto. For example, the buffer memory device 150 may be arranged in the memory controller 130. The buffer memory device 150 may be a working memory.

The storage 140 may be connected with the memory controller 130 through at least one channel CH0~CHn. The storage 140 may include at least one non-volatile memory devices NVM00~NVM0$k$, NVMn0~NVMnk. In example embodiments, the non-volatile memory devices NVM00~NVM0$k$, NVMn0~NVMnk may include a NAND flash memory, a NOR flash memory, a phase-change RAM (PRAM) using chalcogenide alloys, a resistive RAM (ReRAM) using transition metal oxide, a ferroelectric RAM (FRAM) using a ferroelectric capacitor, a magnetic RAM (MRAM) using a tunneling magneto-resistive (TMR) layer, etc., not limited thereto.

Each of the non-volatile memory devices NVM00~NVM0$k$, NVMn0~NVMnk may include a plurality of memory cells. Each of the memory cells may be operated in a single level cell (SLC) configured to store a bit of data in one memory cell or a multi-level cell (MLC) configured to store a plurality of bits of data in one memory cell.

Each of the non-volatile memory devices NVM00~NVM0$k$, NVMn0~NVMnk may be operated as the SLC memory device or the MLC memory device. Alternatively, a part of the non-volatile memory devices NVM00~NVM0K, NVMn0~NVMnk may be operated as the SLC memory device and another part of the non-volatile memory devices NVM00~NVM0$k$, NVMn0~NVMnk may be operated as the MLC memory device.

A group of the memory cells connected to a same word line among the memory cells in the non-volatile memory devices NVM00~NVM0$k$, NVMn0~NVMnk may be a page. A set of the pages connected to a plurality of word lines may be a memory block. A set of the pages in a plurality of the memory blocks connected to a same or different word lines may a super page. A set of the memory blocks may be a super block. The storage 140 may program or read the data by the page or the super page. The storage 140 may erase the data by the memory block or the super block.

A logical address used for data input/outputs by the external device 110 may be different from a physical address provided to a storage space of the storage 140. A relationship between the logical address and the physical address may be managed by map data. Meta-data including the map data may be stored and changed in the buffer memory device 150. The meta-data may be flushed in the storage 140 when a set time arrives.

In order to synchronize the meta-data in the buffer memory device 150 with the meta-data in the storage 140, the memory controller 130 may include a meta-data flush circuit 20 and a meta-data rebuild circuit 30.

The meta-data flush circuit 20 may program the meta-data stored in the buffer memory device 150 in the storage 140 when the set time arrives. The meta-data flush circuit 20 may periodically build the meta-data in a normal meta-slice having a first size during a first operation mode, for example, a normal operation mode. The meta-data flush circuit 20 may then program the normal metal-slice in the storage 140. The first size and numbers of the normal meta-slice may be determined in accordance with applications and capacities of the storage 140. The first size and the numbers of the normal meta-slice may be classified by identifiers. The meta-data flush circuit 20 may build a part of the data in the normal meta-slice in a modified meta-slice during a second operation mode, for example, an SPO generation mode. The meta-data flush circuit 20 may then program the modified meta-slice in the storage 140. That is, the modified meta-slice may be a part of the meta-data in the normal meta-slice.

Thus, the modified meta-slice may have a second size smaller than the first size of the normal meta-slice. The modified metal-slice may be classified by an identifier corresponding to the normal meta-slice.

The modified meta-slice and/or the normal meta-slice may include context ctx data including information of the sizes or information of the operations mode in which the flush may be operated.

The meta-data in the buffer memory device 150 may be changed. The memory controller 130 may generate journal data for commanding the change of the meta-data.

The meta-data flush circuit 20 may build the meta-page including the normal meta-data or the modified meta-slice, the context data and the journal data. A size of the meta-page may be a data program/read unit with respect to the storage 140. In example embodiments, the size of the meta-page may correspond to a size of the page or the super page.

The meta-data rebuild circuit 30 may read the meta-page from the storage 140 when a normal power-on of the data storage device 120 is performed and/or a power-on of the data storage device 120 is performed after the SPO. The meta-data rebuild circuit 30 may rebuild the meta-data based on the context data and the journal data. Particularly, the meta-data rebuild circuit 30 may determine a restoring way of the meta-data based on the context data in the meta-page read from the storage 140.

Figure 2:
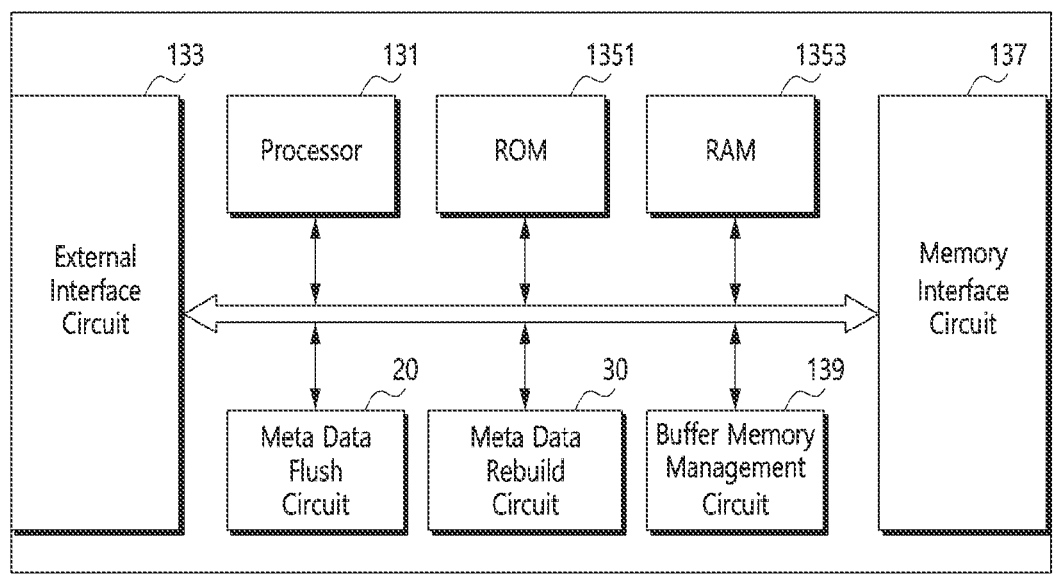
FIG. 2 is a view illustrating a memory controller in accordance with example embodiments.

FIG. 2 is a view illustrating a memory controller in accordance with example embodiments.

Referring to FIG. 2, the memory controller 130 may include a processor 131, an external interface circuit 133, a ROM 1351, a RAM 1353, a memory interface circuit 137, a buffer memory management circuit 139, the meta-data flush circuit 20, and the meta-data rebuild circuit 30.

The processor 131 may provide the external interface circuit 133, the RAM 1353, the memory interface circuit 137, the buffer memory management circuit 139, the meta-data flush circuit 20, and the meta-data rebuild circuit 30 with various control information required for a read operation or a write operation of data with respect to the storage 140. In example embodiments, the processor 131 may be operated in accordance with a firmware provided for various operations of the data storage device 120. The processor 131 may perform a function of a flash transition layer (FTL) for managing the storage 140, for example, a garbage collection, an address mapping, a wear leveling, etc. The processor 131 may include a combination of a hardware and a software operated on the hardware.

The external interface circuit 133 may include an external device interface circuit. The external interface circuit 133 may receive a command and a clock signal from the external device 10, for example, a host device in accordance with controls of the processor 131. The external interface circuit 133 may provide a communication channel for controlling the data input/output. The external interface circuit 133 may provide a physical connection between the external device and the data storage device 120. The external interface circuit 133 may interface with the data storage device 120 corresponding to a bus format of the external device. The bus format may include at least one of a universal serial bus (USB) protocol, a multi-media card (MMC) protocol, a peripheral component interconnection (PCI) protocol, a PCI-express protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a private protocol, etc.

The ROM 1351 may store a program code required for operating the memory controller 130, for example, the firmware or the software, and code data used by the program codes.

The RAM 1353 may store data required for operating the memory controller 130 or data generated by the memory controller 130. For example, the RAM 1353 may include an SRAM. The RAM 1353 may be used as a buffer memory, an operation memory, or a cache memory of the memory controller 130. In example embodiments, the meta-data, the context data, and the journal data may be stored in the RAM 1353.

The memory interface circuit 137 may provide a communication channel for transmitting a signal between the memory controller 130 and the storage 140. The memory interface circuit 137 may register the data, which may be temporarily stored in the buffer memory device 150, in the storage 140 by the controls of the processor 131. The memory interface circuit 137 may transmit and temporarily store the data read from the storage 140.

The buffer memory management circuit 139 may allot or release regions in the buffer memory device 150 for temporarily storing the data in the buffer memory device 150.

The processor 131 may perform the program operation, the read operation, and the erase operation of the user data, and background operations, such as the garbage collection, an address mapping, a wear leveling, etc., for maintaining and repairing the data storage device 120 to generate the meta-data. When the meta-data is changed, the processor 131 may generate the journal data for instructing the change record. The journal data may include information for instructing the different operations where the meta-data are to be changed and information for restoring the meta-data.

When the meta-data is changed, the processor 131 may renew the meta-data and the journal data. The meta-data and the journal data may be stored in the RAM 1353 or the buffer memory device 150. The processor 131 may rebuild the metal data and the journal data into new information when the power-on of the data storage device 120 is performed.

Figure 3:
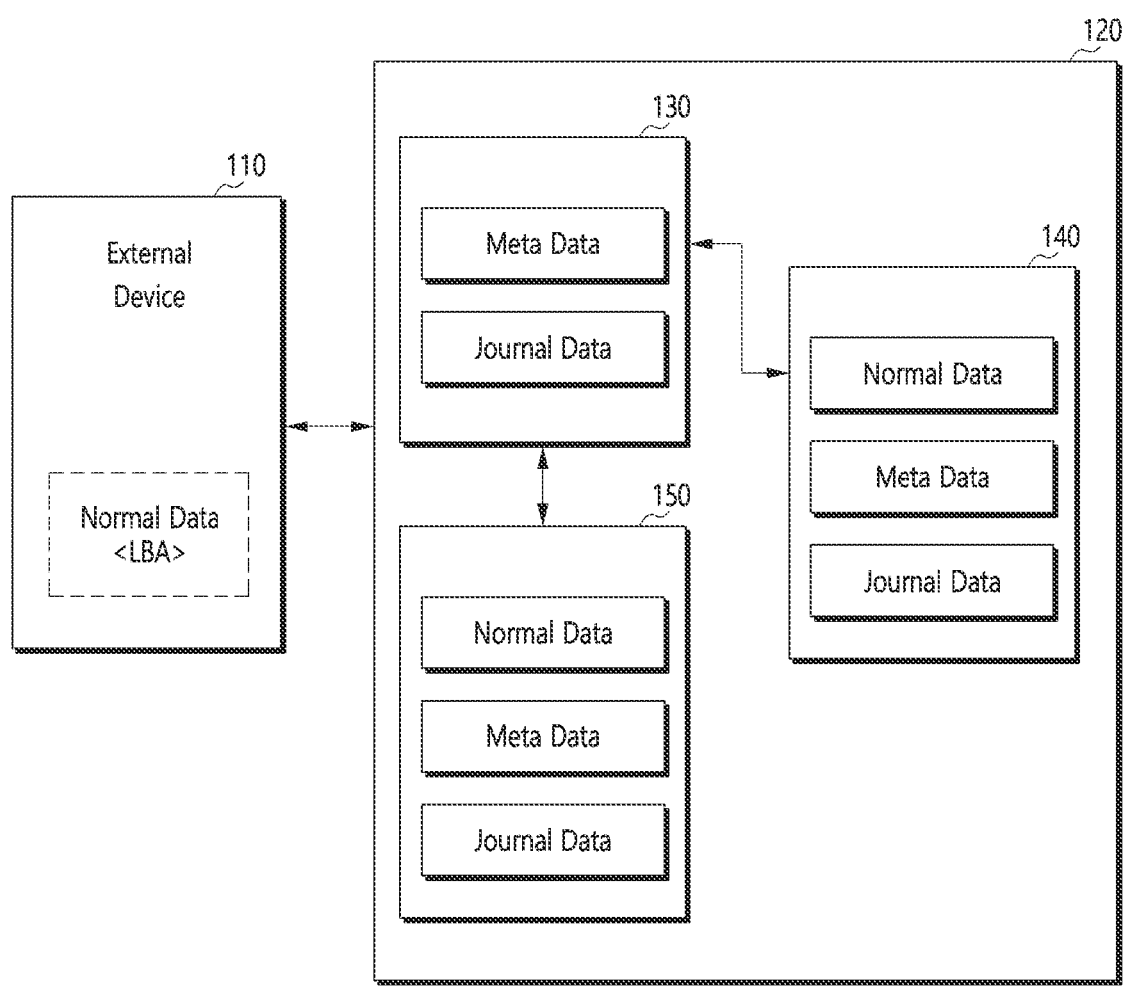
FIG. 3 is a view illustrating a management concept of meta-data device in accordance with example embodiments.

FIG. 3 is a view illustrating a management concept of meta-data device in accordance with example embodiments.

Referring to FIG. 3, in order to store data, which may be requested by the external device 110, such as the host device, in the storage space of the storage 140 including the non-volatile memory device, the data storage device 120 may perform a mapping for connecting a file system used by the external device with the storage space in the storage 140. When the external device 110 transmits a logical address LBA together with a write command and data to the data storage device 120, the data storage device 120 may search for the storage space in the storage 140 for storing the data. The data storage device 120 may map the physical address of the storage space with the logical address LBA provided from the external device 110. The data storage device 120 may then program the data in the storage space. When the external device 110 transmits the logical address LBA with the read command to the data storage device 120, the data storage device 120 may search for the physical address mapped with the logical address LBA. The data storage device 120 may then output the data stored in the searched physical address to the external device 110.

That is, the external device 110 may manage the normal data Normal Data, for example, user data, by using the logical address LBA. The memory controller 130 of the data storage device 120 may map the logical address LBA from the external device 110 with the physical address for representing a physical space in the storage 140 configured to store the normal data Normal Data. The memory controller 130 may then store the normal data Normal Data in the mapped physical address.

The map data as the mapping information of the logical-physical addresses may be generated as a part of the meta-data Meta Data.

Figure 4:
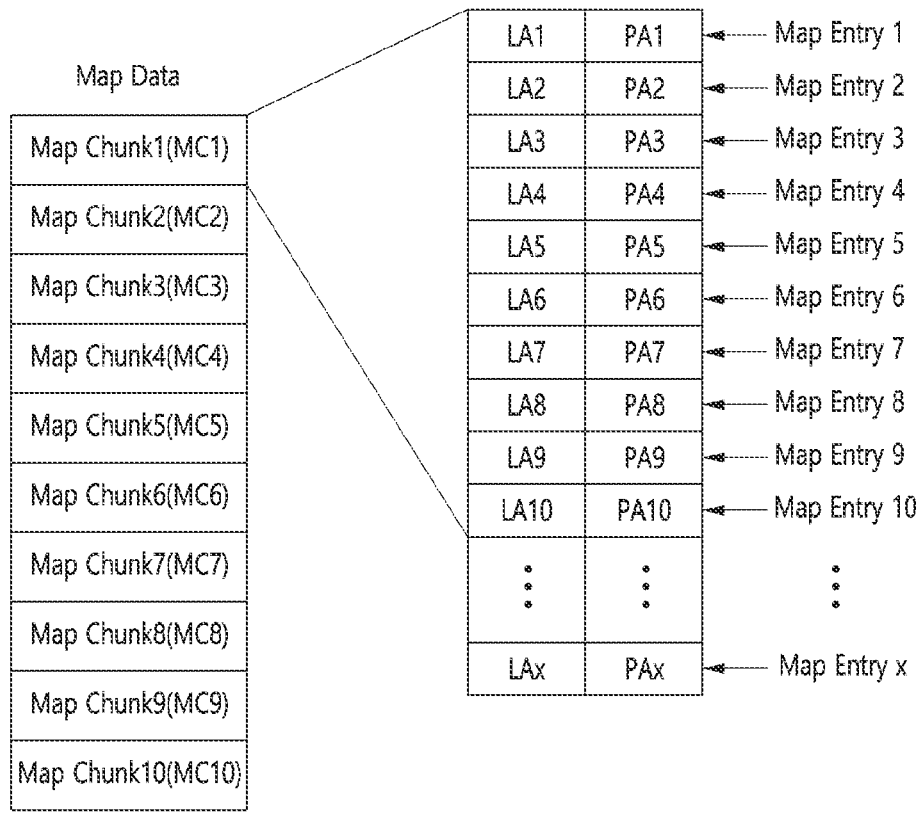
FIG. 4 is a view illustrating map data in accordance with example embodiments.

FIG. 4 is a view illustrating map data in accordance with example embodiments.

Referring to FIG. 4, the map data Map Data may include a plurality of map chunks Map Chunk. One map chunk Map Chunk may include a plurality of map entries Map Entry. One map entry Map Entry may include single mapping information including a logical address LA and a physical address PA.

One normal/modified meta-slice may include the map chunks Map Chunk.

Because the meta-data including the map data may have a relatively large size, a part of the meta-data may be mainly changed. Thus, the change of the meta-data may be instructed through the journal data to reduce a load caused by renewing the total meta-data.

The journal data may include information of a renewed map entry Map Entry among the map entries Map Entry. The journal data may include a plurality of journal entries. One journal entry may include information with respect to a renewal of one map entry Map Entry. For example, because the journal entry may include the previous physical address PA of the logical address LA and the renewed physical address PA, the memory controller 130 may rebuild the newest map data using the journal entries.

Referring to FIG. 3, the mapping information in the meta-data Meta Data may be updated in response to updating the normal data Normal Data by the external device 110 in accordance with the operation of the data processing system 10. The memory controller 130 may store the meta-data Meta Data generated or updated in the memory controller 130 in the buffer memory device 150. The memory controller 130 may generate the journal data Journal Data as the history information with respect to the updating of the meta-data Meta Data. The memory controller 130 may then store the journal data Journal Data in the buffer memory device 150.

The flash translation layer (FTL) in the memory controller 130 may perform the operation for mapping the logical address LBA with the physical address to generate the meta-data Meta Data and for collecting the history information with respect to the updating of the metal-data Meta Data to generate the journal data Journal Data.

The meta-data Meta Data and the journal data Journal Data generated in response to the normal data Normal Data inputted/outputted between the external device 110 and the data storage device 120 may be temporarily stored in the buffer memory device 150. The meta-data Meta Data and the journal data Journal Data may then be flushed in the storage 140.

When the power-on of the data storage device 120 is performed, the meta-data Meta Data and the journal data Journal Data in the storage 140 may be loaded into the buffer memory device 150. The meta-data Meta Data and the journal data Journal Data may be rebuilt into the new information.

Referring to FIG. 2, when the set time arrives, the meta-data flush circuit 20 may program the meta-data in the RAM 1353 or the buffer memory device 150 in the storage 140. In example embodiments, the meta-data flush circuit 20 may classify the meta-data into the normal meta-slices having the first size in the first operation mode, for example,
the normal operation mode. The meta-data flush circuit 20 may periodically program the normal meta-slices in the storage 140. The normal meta-slices may be classified by the identifiers.

The meta-data flush circuit 20 may program the modified meta-slice as the part of the normal meta-slice in the storage 140 in the second operation mode, for example, the generation of the SPO. The modified meta-slice may have the second size. The second size may be smaller than the first size.

When the normal meta-slice having a specific identifier is recognized as an object to be flushed in the generation of the SPO, the meta-data flush circuit 20 may form the part of the meta-data in the normal meta-slice to be flushed as the modified meta-slice. Thus, the modified meta-slice derived from the normal meta-slice having the specific identifier may have an identifier corresponding to the normal met-slice.

The meta-data flush circuit 20 may generate the context data with respect to the normal meta-slice and/or the modified meta-slice. The context data may include the information for instructing the size of the meta-slice or the modified meta-slice and/or the information with respect to the flushed operation modes.

The meta-data flush circuit 20 may form the meta-page including the normal meta-slice or the modified meta-slice, the context data and the journal data. The size of the meta-page may be the data program/read unit with respect to the storage 140. In example embodiments, the size of the meta-page may correspond to the size of the page or the super page.

When the power-on of the data storage device 120 is performed, the meta-data rebuild circuit 30 may load the meta-pages in the storage 140 into the operation memory, such as the RAM 1353 or the buffer memory device 150. The meta-data rebuild circuit 30 may rebuild the meta-data based on the context data and the journal data in each of the meta-pages. Particularly, the meta-data rebuild circuit 30 may determine the restoring way of the meta-slice (normal meta-slice or modified meta-slice) in the corresponding meta-page based on the context data by the meta-page.

For example, when a first meta-page includes a first normal meta-slice having the first size through first context data of a first meta-page loaded into the operation memory (that is, when the first meta-page includes the first normal meta-slice flushed in the first operation mode), the meta-data rebuild circuit 30 may derive the change history of the meta-data in the first normal meta-slice using the first journal data in the first meta-page to rebuild the meta-data into the new information.

For example, when a second meta-page includes a second normal meta-slice having the first size through context data of a second meta-page loaded into the operation memory (that is, when the second meta-page includes the second normal meta-slice flushed in the second operation mode), the meta-data rebuild circuit 30 may read a third meta-page including a third normal meta-slice corresponding to the identifier of the modified meta-slice from the storage 140. The meta-data rebuild circuit 30 may load the third meta-page into the RAM 1353 or the buffer memory device 150. The third meta-page may be a meta-page flushed in the storage 140 in the first operation mode.

Therefore, the second meta-page including the modified meta-slice, the second context data, and the second journal data, and the third meta-page including the third normal meta-slice corresponding to the modified meta-slice may be loaded into the RAM 1353 or the buffer memory device 150 when the power-on is performed after the SPO. The meta-data rebuild circuit 30 may update the meta-data in the third normal meta-slice based on the meta-data in the modified meta-slice. The meta-data rebuild circuit 30 may extract the second journal data from the second meta-page to rebuild the third normal meta-slice into new information.

Figure 5:
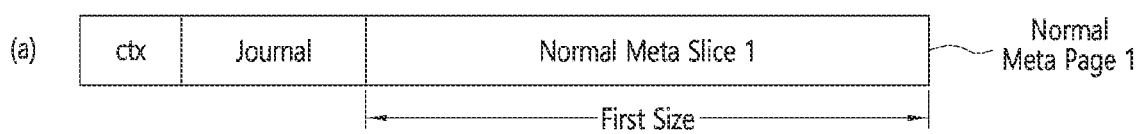
FIG. 5 is a view illustrating a meta-page in accordance with example embodiments.
Figure 5:
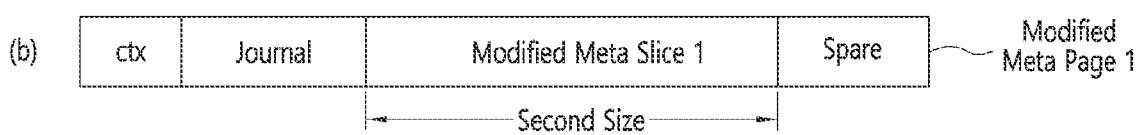

FIG. 5 is a view illustrating a meta-page in accordance with example embodiments.

Part (a) of FIG. 5 shows a normal meta-page Normal Meta Page flushed in the storage 140 in the first operation mode. A first normal meta-page Normal Meta Page 1 may include context data ctx, journal data Journal, and a first normal meta-slice Normal Meta Slice 1. The first normal meta-slice Normal Meta Slice 1 may have an identifier of "1". The first normal meta-slice Normal Meta Slice 1 may have a first size First Size.

A total size of a normal meta-page Normal Meta Page may be a data program/read unit with respect to the storage 140. In example embodiments, a size of the meta page may correspond to a size of the page or the super page.

Part (b) of FIG. 5 shows a modified meta-page Modified Meta Page flushed in the storage 140 in the second operation mode. A first modified meta-page Modified Meta Page 1 may include context data ctx, journal data Journal, and a first modified meta-slice Modified Meta Slice 1. The first modified meta-slice Modified Meta Slice 1 may have an identifier of "1". That is, the first modified meta-slice Modified Meta Slice 1 may be derived from the first normal meta-slice Normal Meta Slice 1. For example, the first modified meta-slice Modified Meta Slice 1 may be a part of the meta-data in the first normal meta-slice Normal Meta Slice 1.

The first modified meta-slice Modified Meta Slice 1 may have a second size Second Size that is smaller than the first size First Size.

The memory controller 130 may form the meta-page including the modified meta-slice Modified Meta Slice in the SPO. Thus, sizes of the data read, the date transmission and the data program may be reduced by a spare corresponding to a difference between the first size First Size of the normal meta-slice Normal Meta Slice and the second size Second Size of the modified meta-slice Modified Meta Slice in the SPO.

The data storage device 120 may be operated by power provided from an auxiliary power source in the generation of the SPO. Thus, the size of the data flushed in the SPO may be reduced to decrease a flush time and power consumption of the auxiliary power source.

Figure 6:
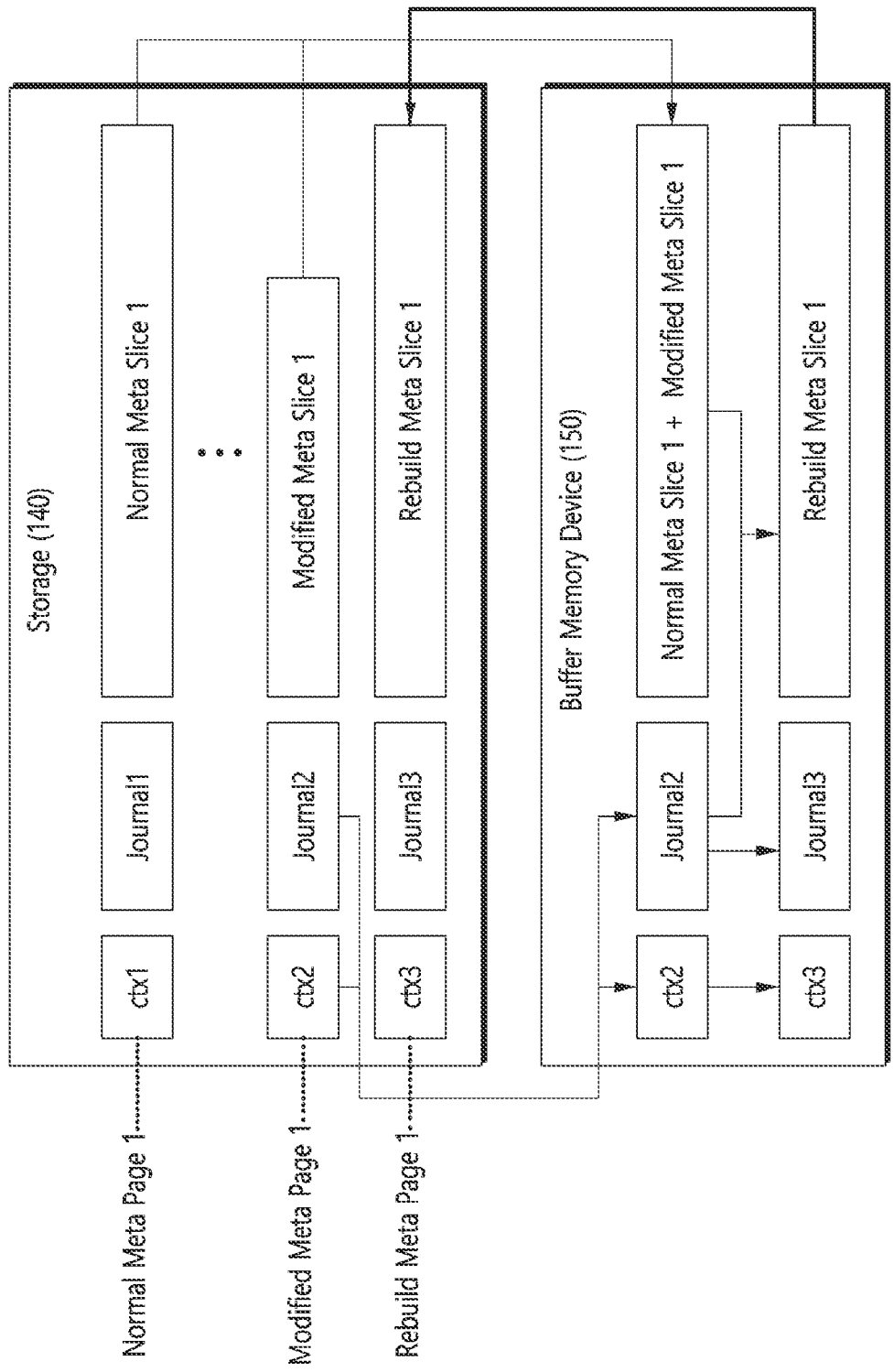
FIG. 6 is a view illustrating a rebuild method of meta-data in accordance with example embodiments.

FIG. 6 is a view illustrating a rebuild method of meta-data in accordance with example embodiments.

Referring to FIG. 6, the memory controller 130 may load the meta-pages in the storage 140 into the operation memory, such as the buffer memory device 150, when the normal power-on of the data storage device 120 is performed or the power-on of the data storage device 120 is performed after the SPO. The normal meta-page including the normal meta-slice may be stored in the storage 140. Further, the modified meta-slice may be stored in the storage 140.

FIG. 6 may show the first normal meta-page Normal Meta Page 1 and the first modified meta-page Modified Meta Page 1 stored in the storage 140. The first normal meta-page Normal Meta Page 1 may include first context data ctx1, first journal data Journal 1, and a first normal meta-slice Normal Meta Slice 1. The first modified meta-page Modified Meta Page 1 may include second context data ctx2, second journal data Journal 2, and a first modified meta-slice Modified Meta slice 1.

The memory controller 130 may recognize a time at which the corresponding page is flushed or a length of the meta-slice in the corresponding meta-page through the context data of the last meta page to have been stored in the storage 140.

For example, when the last meta-page to have been stored is the modified meta-page Modified Meta Page 1, the memory controller 130 may recognize the meta-slice in the modified meta-page 1 Modified Meta Page as the modified meta-slice Modified Meta Slice 1 having the second size through the second context data ctx2.

The memory controller 130 may store the modified meta-page Modified Meta Page 1 and an identifier corresponding to the modified meta-page Modified Meta Page 1, for example, the first normal meta-slice Normal Meta Slice 1 having the same identifier in the buffer memory device 150. The first normal meta-slice Normal Meta Slice 1 may be a meta-slice flushed in the storage 140 in the first operation mode.

The memory controller 130 may update the meta-data in the first normal meta-slice Normal Meta slice 1 based on the modified meta-slice Modified Meta Slice 1 in the modified meta-page Modified Meta page 1. The memory controller 130 may extract the second journal data Journal 2 from the modified meta-slice Modified Meta Slice 1. The memory controller 130 may then rebuild the meta-data in the updated first normal meta-slice Normal Meta Slice 1 into new information to generate a rebuilt first meta-slice Rebuild Meta Slice 1. Third context data ctx3 and third journal data Journal 3 may be generated based on map data renewed in generating the rebuilt first meta-page Rebuild Meta page 1.

The memory controller 130 may program third context data ctx3, the third journal data Journal 3, and the rebuilt first meta-page Rebuild meta page 1 including the rebuilt first meta-slice Rebuild Meta Slice 1 in the storage 140.

In example embodiments, when the lastly stored meta-page is the normal meta-page, the memory controller 130 may rebuild the normal meta-slice based on the journal data in the normal meta-page.

According to example embodiments, the amount of the meta-data flushed in the SPO may be minimized to improve efficiency of the auxiliary power source. Further, the meta-data may be rebuilt in the new state by only using the minimally flushed meta-data to guarantee reliability of the data storage device.

The above described embodiments of the present disclosure are intended to merely illustrate and is not to limit the present disclosure. Various alternatives and equivalents are possible. The invention is not limited by the embodiments described herein. Nor is the invention limited to any specific type of semiconductor device. Another additions, subtractions, or modifications are obvious in view of the present disclosure and are intended to fall within the scope of the appended claims.

What is claimed is:

1. A data storage device comprising:
a storage configured to store data; and
a memory controller configured to:
generate meta-data including a mapping relationship between a logical address used by an external device and a physical address used by the storage,
generate a normal meta-slice having a first size including the meta-data in a first operation mode,
store a meta-page including the normal meta-slice in the storage, generate a modified meta-slice having a second size as a part of the normal meta-slice in a second operation mode, store a meta-page including the modified meta-slice and context data including information with respect to a size of the modified meta-slice, and restore the meta-data based on the context data in a power-on.

2. The data storage device of claim 1, wherein the second operation mode is a sudden power-off (SPO) generation mode.

3. The data storage device of claim 1, wherein the second size is smaller than the first size.

4. The data storage device of claim 1, wherein the memory controller reads the meta-page from the storage in the power-on and updates meta-data of a normal meta-slice corresponding to the meta-slice in accordance with meta-data in the modified meta-slice to generate an updated meta-slice when the context data in the meta-page has the second size.

5. The data storage device of claim 4, wherein the memory controller generates journal data for instructing a change record of the meta-data and the memory controller stores the journal data in the meta-page.

6. The data storage device of claim 5, wherein the memory controller rebuilds meta-data of the updated meta-slice based on the journal data in the meta-page including the modified meta-slice to generate a rebuilt meta-slice.

7. A memory controller comprising:
a processor configured to generate meta-data including a mapping relationship between a logical address used by an external device and a physical address used by the storage;
a meta-data flush circuit configured to:
generate a normal meta-slice having a first size including the meta-data in a first operation mode,
store a meta-page including the normal meta-slice in a storage,
generate a modified meta-slice having a second size as a part of the normal meta-slice in a second operation mode, and
store a meta-page including the modified meta-slice and context data including information with respect to a size of the modified meta-slice; and
a meta-data rebuild circuit configured to restore the meta-data based on the context data in a power-on.

8. The memory controller of claim 7, wherein the second operation mode is a sudden power-off (SPO) generation mode.

9. The memory controller of claim 7, wherein the second size is smaller than the first size.

10. The memory controller of claim 7, wherein the meta-data rebuild circuit reads the meta-page from the storage in the power-on and updates meta-data of a normal meta-slice corresponding to the meta-slice in accordance with meta-data in the modified meta-slice to generate an updated meta-slice when the context data in the meta-page has the second size.

11. The memory controller of claim 10, wherein the meta-data rebuild circuit generates journal data for instructing a change record of the meta-data and the memory controller stores the journal data in the meta-page.

12. The memory controller of claim 11, wherein the meta-data rebuild circuit rebuilds meta-data of the updated meta-slice based on the journal data in the meta-page including the modified meta-slice to generate a rebuilt meta-slice.

13. A method of operating a data storage device, the data storage device including a storage and a memory controller configured to control the storage, the method comprising:
generating meta-data including a mapping relationship between a logical address used by an external device and a physical address used by the storage by the memory controller;
generating a normal meta-slice having a first size including the meta-data in a first operation mode by the memory controller;
storing a meta-page including the normal meta-slice in the storage by the memory controller;
generating a modified meta-slice having a second size as a part of the normal meta-slice in a second operation mode by the memory controller;
storing a meta-page including the modified meta-slice and context data including information with respect to a size of the modified meta-slice by the memory controller; and
restoring the meta-data based on the context data in a power-on by the memory controller.

14. The method of claim 13, wherein the second operation mode is a sudden power-off (SPO) generation mode.

15. The method of claim 13, wherein the second size is smaller than the first size.

16. The method of claim 13, further comprising:
reading the meta-page from the storage in the power-on by the memory controller; and
updating, by the memory controller, meta-data of a normal meta-slice corresponding to the meta-slice in accordance with meta-data in the modified meta-slice to generate an updated meta-slice when the context data in the meta-page has the second size.

17. The method of claim 16, further comprising generating journal data for instructing a change record of the meta-data and the memory controller stores the journal data in the meta-page by the memory controller.

18. The method of claim 17, further comprising rebuilding meta-data of the updated meta-slice based on the journal data in the meta-page including the modified meta-slice to generate a rebuilt meta-slice by the memory controller.

* * * * *